(12) United States Patent
Ogata

(10) Patent No.: US 7,212,317 B2
(45) Date of Patent: May 1, 2007

(54) ORIGINAL SCANNING APPARATUS

(75) Inventor: Atsushi Ogata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 847 days.

(21) Appl. No.: 10/187,792

(22) Filed: Jul. 3, 2002

(65) Prior Publication Data
US 2003/0007199 A1 Jan. 9, 2003

(30) Foreign Application Priority Data
Jul. 5, 2001 (JP) ............... 2001-204940
Dec. 25, 2001 (JP) ............... 2001-391223

(51) Int. Cl.
H04N 1/04 (2006.01)
(52) U.S. Cl. ............ 358/474; 358/471; 358/475; 358/496; 358/497; 358/498; 358/408; 358/482; 358/483
(58) Field of Classification Search ........... 358/471, 358/474, 482, 483, 494, 496–498, 475, 408, 358/401, 501, 505, 509, 512–514; 399/363–367, 399/374, 211, 212; 355/23, 24, 68; 250/208.1, 250/239, 216, 234–236
See application file for complete search history.

(56) References Cited

U.S. PATENT DOCUMENTS

| 4,812,917 | A | * | 3/1989 | Suzuki | ............... 358/451 |
| 6,172,774 | B1 | * | 1/2001 | Yamashita | ............ 358/474 |
| 6,323,933 | B1 | * | 11/2001 | Anzai | ................ 355/23 |
| 6,760,131 | B2 | * | 7/2004 | Kaji | ................. 358/474 |
| 6,917,453 | B1 | * | 7/2005 | Onishi et al. | ....... 358/483 |

FOREIGN PATENT DOCUMENTS

JP 06268814 A * 9/1994

OTHER PUBLICATIONS

U.S. Appl. No. 09/881,703, filed Jun. 18, 2001.

* cited by examiner

Primary Examiner—Cheukfan Lee
(74) Attorney, Agent, or Firm—Fitzpatrick, Cella, Harper & Scinto

(57) ABSTRACT

An original scanning apparatus is provided in which a translucent member can be easily cleaned. A glass (31) on a reading surface is configured openable and closable with respect to an upper original conveying guide (24), whereby a surface (C) on the inner side of the glass (31) in a reading window can be easily cleaned and deterioration of an image due to a dust inside the apparatus adhering to the surface (C) on the inner side of the glass (31) can be prevented.

12 Claims, 13 Drawing Sheets

ORIGINAL SCANNING APPARATUS

BACKGROUND OF THE INVENTION

1. Field of the Invention

The present invention relates to an original scanning apparatus for scanning an original, and more particularly, to an apparatus provided with a translucent member in an original scanning unit.

2. Description of the Related Art

Conventionally, as modes for reading an image on an original which are employed in an image reading apparatus, the following two modes are well known.

First, a first mode is an original stationary reading mode for setting an original on an original table with a predetermined method and scanning the original set on an original table glass by a movable optical carriage, thereby reading the image on the original in an image reading part.

In addition, a second mode is an original flow reading mode for conveying an original at a predetermined conveying speed and reading an image on the original in a predetermined reading part where a stationary optical carriage unit is disposed.

In the latter original flow reading mode, the optical carriage can be fixed and it is unnecessary to reciprocatingly move the optical carriage every time image is read, as opposed to the former original stationary reading mode. Consequently, the latter original flow reading mode has advantages over the former original stationary reading mode in that an apparatus configuration is not complicated and acceleration of processing is realized.

Moreover, in a copying machine and the like, it has become sufficient to read an original only once even if a plurality of copies are formed from an identical original as a digital processing technique has advanced in recent years. That is, when image information is read once, it is temporarily stored as digital information in a storage medium such as a computer, whereby it has become easy to re-form a necessary number of copied images based on this stored image information. Image reading by the original flow reading mode has an additional advantage in this respect.

Further, from a viewpoint of realizing convenience of operations and acceleration in reading images in the case in which the images are contained in front and rear surfaces of an original, a reading apparatus has also been manufactured which is provided with opposing two optical carriages along a conveying path of an original and is configured to read images contained in respective surfaces of an original by each optical carriage. According to such an apparatus configuration, since images contained in the front and rear surfaces of the original conveyed along a predetermined path can be almost simultaneously flow-read, acceleration of reading processing in duplex copying of the original can be realized.

However, a reading position of an original is always fixed in the conventional image reading apparatus employing the above-mentioned original flow reading mode. Thus, if a dust adheres to the reading part, the dust is inevitably read while an image is read and appears as a streak over the read image.

In general, since a reading part becomes a conveying surface of a moving original, the original is prevented from entering an inside of an optical system by covering the reading part with a transparent member (translucent plate member) such as glass. This reading surface is required to be cleaned periodically in the image reading apparatus of the original moving system due to the reasons described above.

An outer side, which is an original conveying path side, of the reading surface can be easily cleaned because it is exposed to the outside of the image reading apparatus. However, the image reading apparatus must be disassembled in order to remove a dust adhering to its inside on the opposite side of the original conveying path of the reading surface. In particular, in the case of an image reading apparatus having optical systems (reading units) opposing each other above and below an original conveying path in order to read both surfaces of an original, it is highly likely that, in the optical system on the upper side of the original conveying path, dusts in the optical system deposit on the inner side of glass of the reading unit. Thus, stains on the inner surface of the glass are even more serious.

SUMMARY OF THE INVENTION

An object of the present invention is to provide an original scanning apparatus in which a translucent member can be easily cleaned.

Another object of the present invention is to provide an original scanning apparatus in which breakage of the apparatus or damage to an original that may be caused by a translucent member is prevented.

Still another object of the present invention is to provide an original scanning apparatus which comprises: a light source for illuminating an original; a translucent member through which light from the original illuminated by said light source transmits; and scanning means having said light source and said translucent member, and in which said translucent member is openable and closable with respect to said scanning means.

Other objects of the present invention will become apparent upon reading the description of the invention given hereinbelow.

DETAILED DESCRIPTION OF THE PREFERRED EMBODIMENTS

Preferred embodiments of the present invention will be hereinafter described illustratively with reference to the accompanying drawings.

(First Embodiment)

Figure 1:
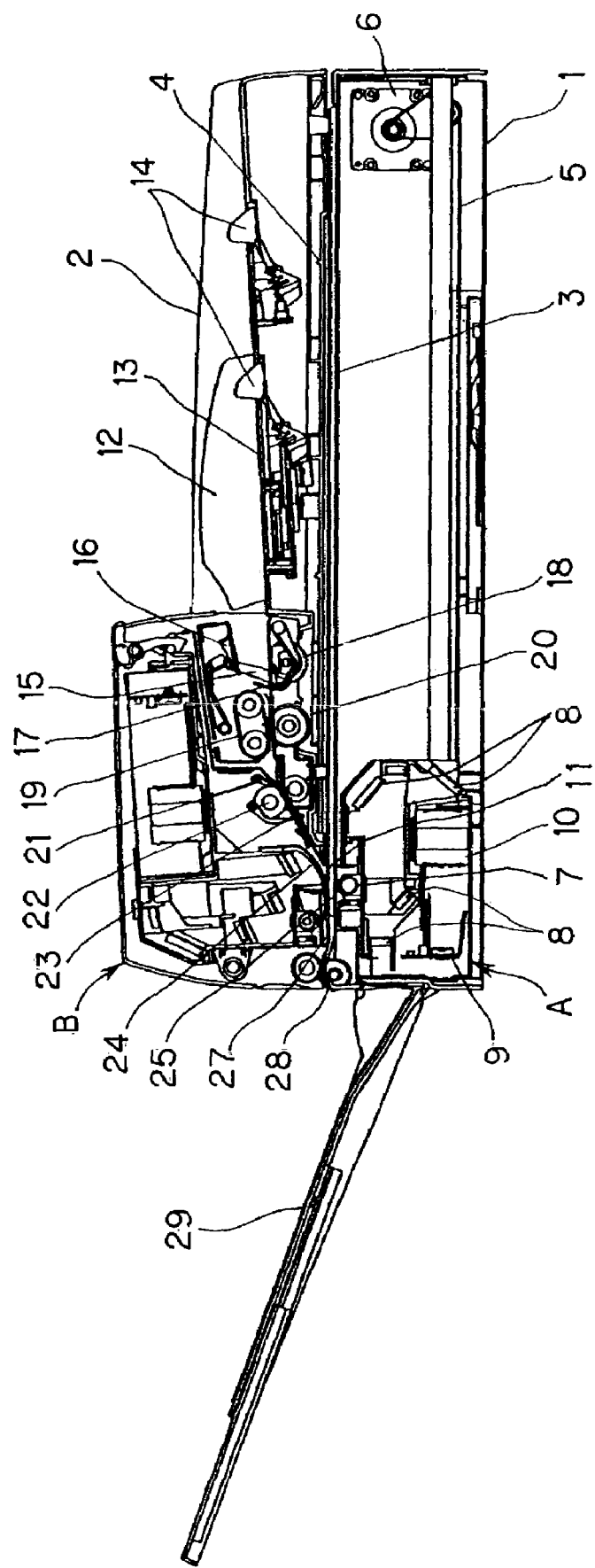
FIG. 1 is a view showing an image reading apparatus that is a first embodiment of the present invention.
Figure 2:
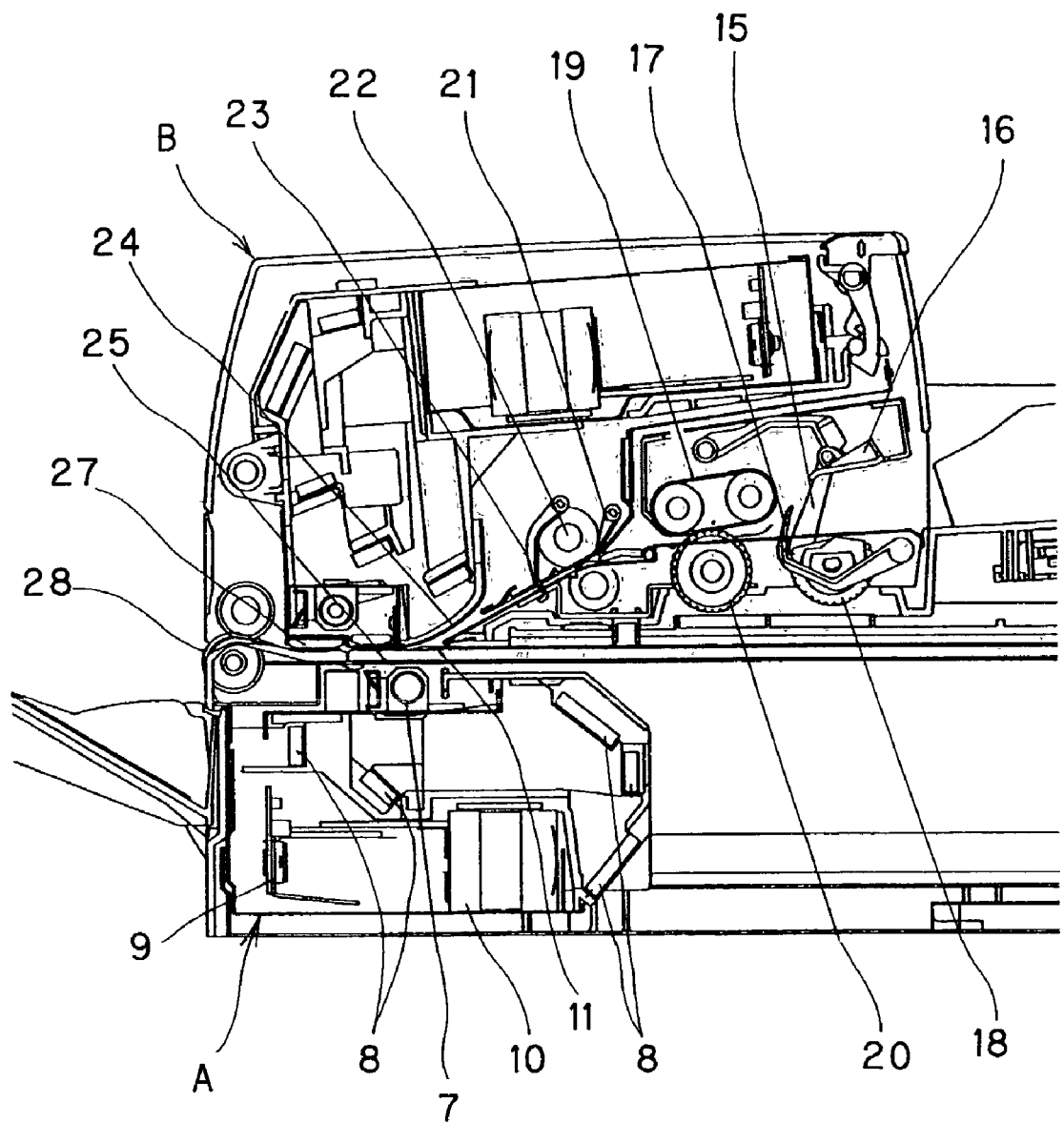
FIG. 2 is a detailed view of an image reading unit of the image reading apparatus.
Figure 3A:
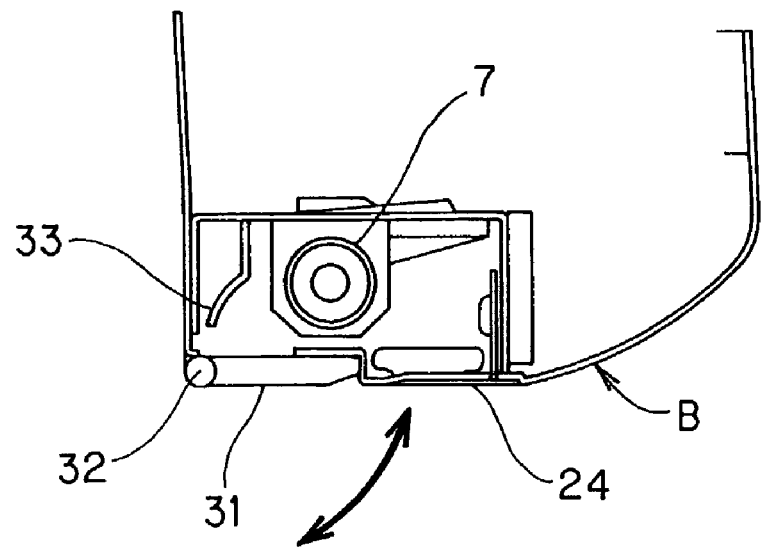
FIGS. 3A and 3B are detailed views of an image reading part of an optical carriage in accordance with the first embodiment of the present invention.
Figure 3B:
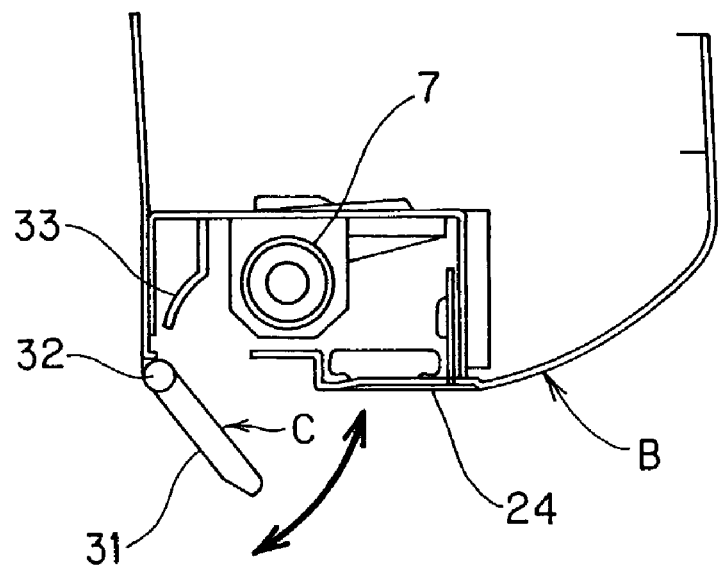

A first embodiment of the present invention will be described with reference to FIGS. 1 to 3. FIG. 1 is a side sectional view schematically showing a structure of an image reading mechanism in accordance with the first embodiment of the present invention. In addition, FIG. 2 is an enlarged side sectional view showing an original conveying unit of the mechanism. Moreover, FIGS. 3A and 3B are enlarged side sectional views showing an image reading part of a second optical carriage B of the mechanism.

As shown in FIGS. 1 and 2, the image reading apparatus functioning as an original scanning apparatus comprises a flat bed (FB) image reading unit (FB unit) 1 for mounting and fixing an original to read a surface image of the original and an automatic sheet-feeding device (ADF unit) 2 attached to an upper surface of the FB unit 1. Moreover, a part of the FB unit 1 and a part of the ADF unit 2 are combined to form an original flow reading unit.

The FB unit 1 is a mechanism for reading a surface image of an original mounted and fixed thereon. The FB unit 1 is provided with a reference original table glass 3 as a translucent plate member on an upper surface of which an original is mounted and is also provided with a first optical carriage A, which functions as first image reading means (first original scanning means) for reading an original, below the original table glass 3.

The first optical carriage A is coupled to an endless driving belt 5. Further, this driving belt 5 is coupled to a driving motor 6. Power of the driving motor 6 is transmitted to the first optical carriage A via the driving belt 5, whereby the first optical carriage A is made movable in parallel with the original table glass 3.

This first optical carriage A is provided with both a function of reading an image on an original mounted and fixed on the original table glass 3 and a function of staying in a fixed position to read an image on an original that is being conveyed (original flow reading function).

A lamp 7 disposed on an upper surface of the first optical carriage A is a light source for irradiating light on an original. Light reflected from the original is guided to a CCD 9 by reflection mirrors 8 and a condensing lens 10. The CCD 9 is a photoelectric conversion element for converting incident light into an electric signal. In addition, an original bumping reference plate 11 is provided on the original table glass 3.

On the other hand, the ADF unit 2 is provided with an original loading tray 13 for mounting and loading an original thereon. An original on the original loading tray 13 is regulated by an original side regulating plate 12 on its both sides in a conveying (feeding) direction. In addition, an original existence sensor 15 recognizes the existence of an original by detecting a leading end of the original with its lever. Moreover, an original length detecting lever 14 detects a length of the original.

In addition, the ADF unit 2 is also provided with a weight 16 for pressing down a leading end of an original delivered from the original loading tray 13 and an original shutter 17 for preventing the leading end of the original from entering a separating and feeding unit.

A pickup roller 18 has a function of letting out loaded originals one after another from the lowermost one. The original let out by the pickup roller 18 is conveyed to the original flow reading unit by a feeding roller 20 on its down stream side.

In addition, a separating belt 19 provided in a position opposing the feeding roller 20 across a conveying path of an original is driven to rotate in a direction opposite to a rotating direction of the feeding roller 20, thereby separating stacked originals such that the originals are surely delivered one by one.

A pre-registration sensor lever 21 detects a leading end of an original to take timing for making a loop of the original. A registration roller pair 22 delivers a conveyed original to the first optical carriage A at predetermined timing. An original leading end detecting lever 23 detects the leading end of the original delivered by the registration roller pair 22.

An upper original conveying guide 24 functioning as guiding means is provided to oppose the original table glass 3 and guides an original to a first reading part 25. The first reading part 25 is a predetermined gap provided between the original table glass 3 and the upper original conveying guide 24. An image contained in one surface of an original (first surface (lower surface)) is read by the first optical carriage A staying in a fixed position when the original passes through the first reading part 25.

A second optical carriage B functioning as second image reading means (second original scanning means) is provided in a position opposing the first optical carriage A across the original table glass 3 in the ADF unit 2 functioning as holding means for holding the second optical carriage B.

A light source, reflection mirrors and a CCD, which are the same as those in the first optical carriage A, are arranged in the second optical carriage B.

In this way, the second optical carriage B provided with substantially the same configuration as the first optical carriage A reads an image contained in the other surface of the original (second surface (upper surface)) in a second reading part 27. The second reading part 27 is set slightly on a downstream side of the first reading part 25 on a conveying path of an original along the original table glass 3.

The original is discharged to the outside of the FB unit 1 by a discharge roller pair 28 after passing through the first and second reading parts 25 and 27. A discharged sheet stacking tray 29 for stacking thereon originals discharged by the discharge roller pair 28 is provided on one side of the FB unit 1.

FIG. 3A is a side sectional view of the vicinity of the reading part 27 of the second optical carriage B that forms a part of the ADF unit 2. Transparent glass (translucent plate member) 31 as a translucent member is attached to the second reading part 27 of the second optical carriage B of the ADF unit 2. The transparent glass 31 functions as an optical path for taking reflected light of an original into an optical system and, at the same time, forms a conveying surface for the original to prevent the original from entering a reading window portion (opening) of the optical system.

This glass 31 is supported by the pivotal shaft 32 and the upper original conveying guide 24, wherein the glass 31 is movable pivotally around the pivotal shaft 32 by the optical system and is openable and closable with respect to the second optical carriage B as shown in FIG. 3B. In addition, reference numeral 33 denotes a reflection plate functioning as a reflecting member.

Operations of the image reading apparatus having the above-mentioned configuration will be hereinafter described.

(Original Stationary Reading Mode)

In the case of image reading in the FB unit 1, the ADF unit 2 is opened to place an original on the original table glass 3, and the original is set by bumping the leading end of the original on the original bumping reference plate 11.

Next, the original is pressed and fixed to the original table glass 3 by a pressure plate 4 as the ADF unit 2 is closed. Consequently, curl or the like of the original is corrected and, at the same time, the original is brought into close contact with the original table glass 3.

Thereafter, reading of the original is started as an operator presses an original reading start button provided on a not-shown control panel.

Then, the driving belt 5 starts operation upon supply of power by the driving motor 6, and the first optical carriage A moves to a predetermined initial position accordingly. The first optical carriage A is accelerated until a predetermined speed is reached while moving from the initial position to an original reading position.

After the predetermined speed is reached, the first optical carriage A reaches the leading end position of the original bumped on the original bumping reference plate 11 while keeping the speed. Thereafter, the first optical carriage A continues to move while keeping the predetermined speed to read the original.

After reading the entire surface of the original, the first optical carriage A is reversed in a direction opposite to the reading direction by reverse driving of the driving motor 6 to return to a predetermined standby position.

(Original Flow Reading Mode)

Next, the case of the original flow reading mode will be described. In the case of the flow reading, an original is loaded on the original loading tray 13 of the ADF unit 2.

The ADF unit 2 can recognize that the original has been placed on the original loading tray 13 according to the original length detecting lever 14 and the original existence sensor 15. In addition, an operator sets a width of an original by the original side regulating plate 12, whereby the ADF unit 2 can recognize a size of the original according to the combination of the length detection by the original length detecting lever 14 and the set width.

In the above-mentioned state, when the operator presses the not-shown original reading start button, the original shutter 17 regulating the leading end of the original is opened, and a bundle of originals are conveyed to an original separating portion by the weight 16 and the pickup roller 18. Next, the originals are separated and fed one by one by the separating belt 19 and the feeding roller 20.

After the leading end of the original reaches the registration roller pair 22 and a predetermined loop is formed by the pre-registration sensor lever 21, the rotation of the feeding roller 20 is stopped. After predetermined timing, the registration roller pair 22 starts rotation to convey the original. The leading end of the conveyed original is detected by the original leading end detecting lever 23, and time when the original reaches the original reading position is determined.

The original is guided to the first reading part 25 by the upper original conveying guide 24. In the first reading part 25, images on one surface of the original are read one after another by the first optical carriage A while the original is conveyed at a predetermined conveying speed.

Next, the original reaches the second reading part 27, where images on the other surface of the original are read one after another by the reading unit of the second optical carriage B while the original is similarly conveyed at the predetermined speed.

After the leading end of the original passes through the second reading part 27, the original is conveyed by the discharge roller pair 28. After all the images on the original are read, the original is discharged onto the discharged sheet stacking tray 29.

These are a series of operation forms for reading both surfaces of an original by both the first and second carriages A and B.

In addition, this embodiment has the following characteristics. FIG. 3B shows a state in which the glass 31 is opened with respect to the frame such as the upper original conveying guide 24. In the state in which the glass 31 is opened as shown in FIG. 3B, a user can access a surface (surface on the opposite side of the original conveying side) C in the inner side of the glass 31 and clean the surface C.

According to the image reading apparatus of this embodiment described above, the glass 31 on the reading surface is configured to be openable and closable with respect to the upper original conveying guide 24 that is the frame of the optical system. As a result, the surface C on the inner side of the glass 31 in the reading window can be cleaned easily and an image can be protected from being deteriorated due to a dust inside the apparatus adhering to the surface C on the inner side of the glass 31.

(Second Embodiment)

Figure 4A:
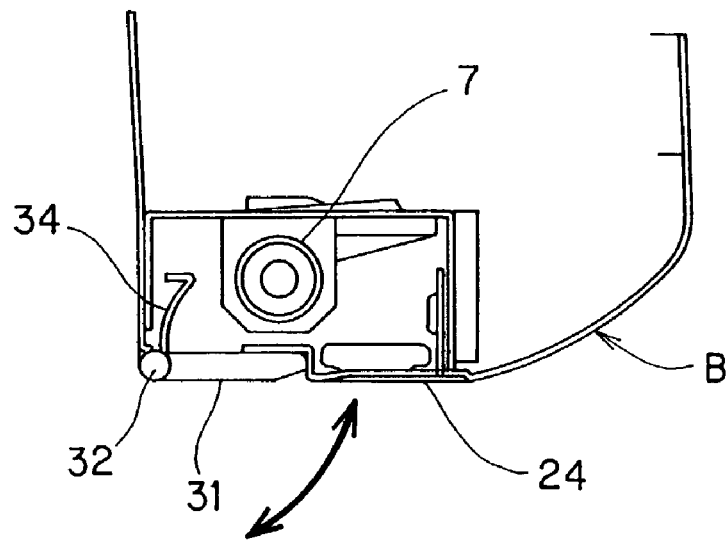
FIGS. 4A and 4B are detailed views of an image reading part of an optical carriage in accordance with a second embodiment of the present invention.
Figure 4B:
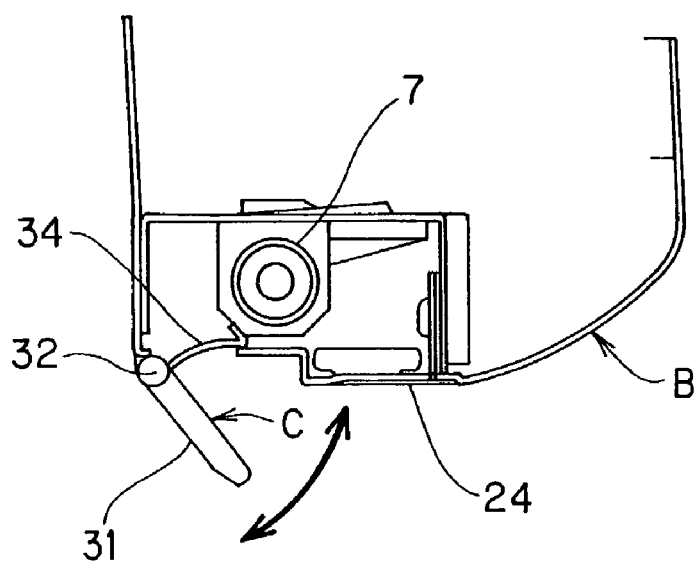

Since this embodiment is basically the same as the configuration shown in FIG. 1, only different parts will be described. FIGS. 4A and 4B show a second embodiment of the present invention. FIGS. 4A and 4B are enlarged side sectional view showing an image reading part of a second optical carriage B in accordance with the second embodiment of the present invention.

In an image reading apparatus having the substantially identical basic configuration as the first embodiment, a reflection plate 34 for irradiating light of the lamp 7 on an original is integrally formed with the glass 31 as shown in FIG. 4A.

That is, the reflection plate 34 is installed on the pivotal shaft 32 in the second optical carriage B so as to be integral with the glass 31, thereby pivoting following the pivotal movement of the pivotal shaft 32.

As shown in FIG. 4B, the surface C on the inner side of the glass 31 can be cleaned by opening the glass 31. At this point, since the reflection plate 34 is integrally formed with the glass 31 in this embodiment, the reflection plate 34 moves to a position for closing an opening that is a reading window of the second optical carriage B in the state in which the glass 31 is opened. As a result, a finger is prevented from carelessly entering the inside of the second optical carriage B to touch the lamp 7 when the surface C on the inner side of the glass 31 is cleaned, or a large dust is prevented from entering the inside of the second optical carriage B.

(Third Embodiment)

Figure 5A:
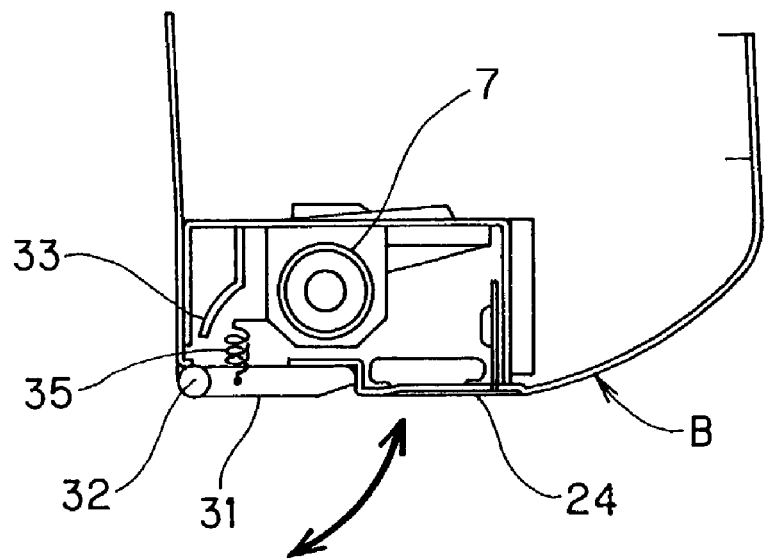
FIGS. 5A and 5B are detailed views of an image reading part of an optical carriage in accordance with a third embodiment of the present invention.
Figure 5B:
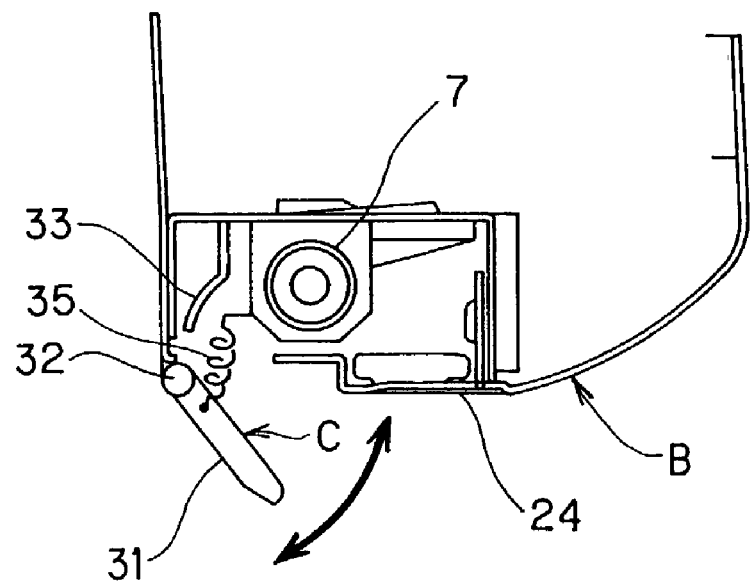

Since this embodiment is basically the same as the configuration shown in FIG. 1, only different parts will be described. In a third embodiment of the present invention, the openable and closable glass 31 is biased in a closing direction of the glass 31 by a biasing member (e.g., rubber or a spring) 35 as shown in FIGS. 5A and 5B in an image reading apparatus having the substantially identical configuration as the first embodiment.

Consequently, the glass 31 can be prevented from opening against a user's intention. In addition, the image reading apparatus can be prevented from being used in a state in which the glass 31 is left open after it is cleaned.

(Fourth Embodiment)

Figure 6A:
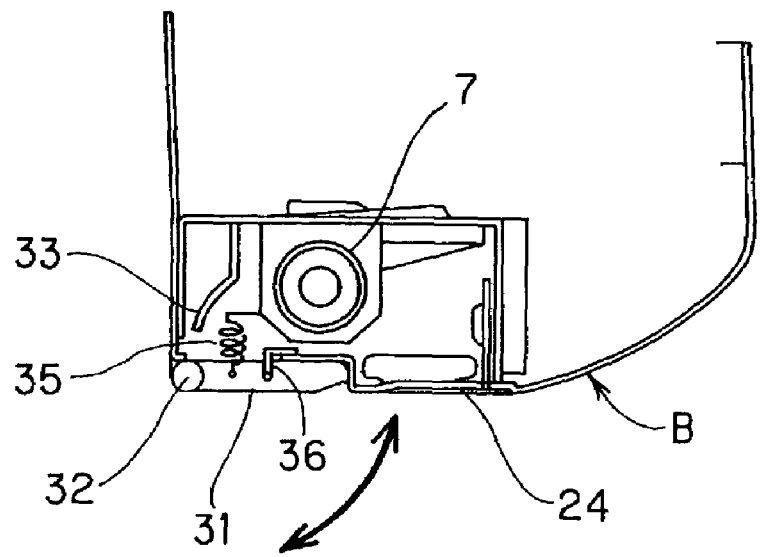
FIGS. 6A and 6B are detailed views of an image reading part of an optical carriage in accordance with a fourth embodiment of the present invention.
Figure 6B:
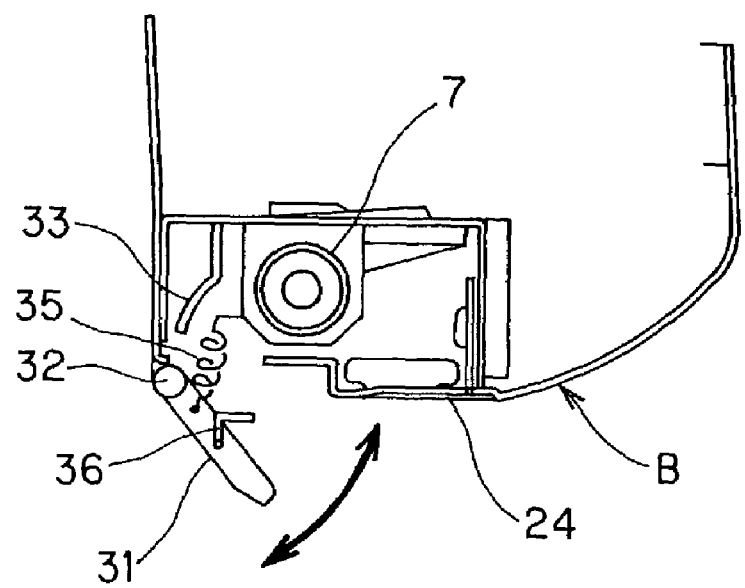

Since this embodiment is basically the same as the configuration shown in FIG. 1, only different parts will be described. In a fourth embodiment of the present invention, the openable and closable glass 31 is biased in an opening direction of the glass 31 by a biasing member (e.g., rubber or a spring) 35 as shown in FIGS. 6A and 6B in an image reading apparatus having the substantially identical configuration as the first embodiment. In addition, the glass 31 is secured to the upper original conveying guide 24 in its closed state by a hook 36 functioning as locking means.

Consequently, the glass 31 is secured to the upper original conveying guide 24 by the hook 36 in the closed state and opens by releasing the hook 36. As a result, serviceability of cleaning work of the glass 31 can be improved.

Further, although the glass 31 is biased by the biasing member 35 in this embodiment, locking of the glass 31 may be performed only by providing a hook without biasing the glass 31.

(Fifth Embodiment)

Figure 7:
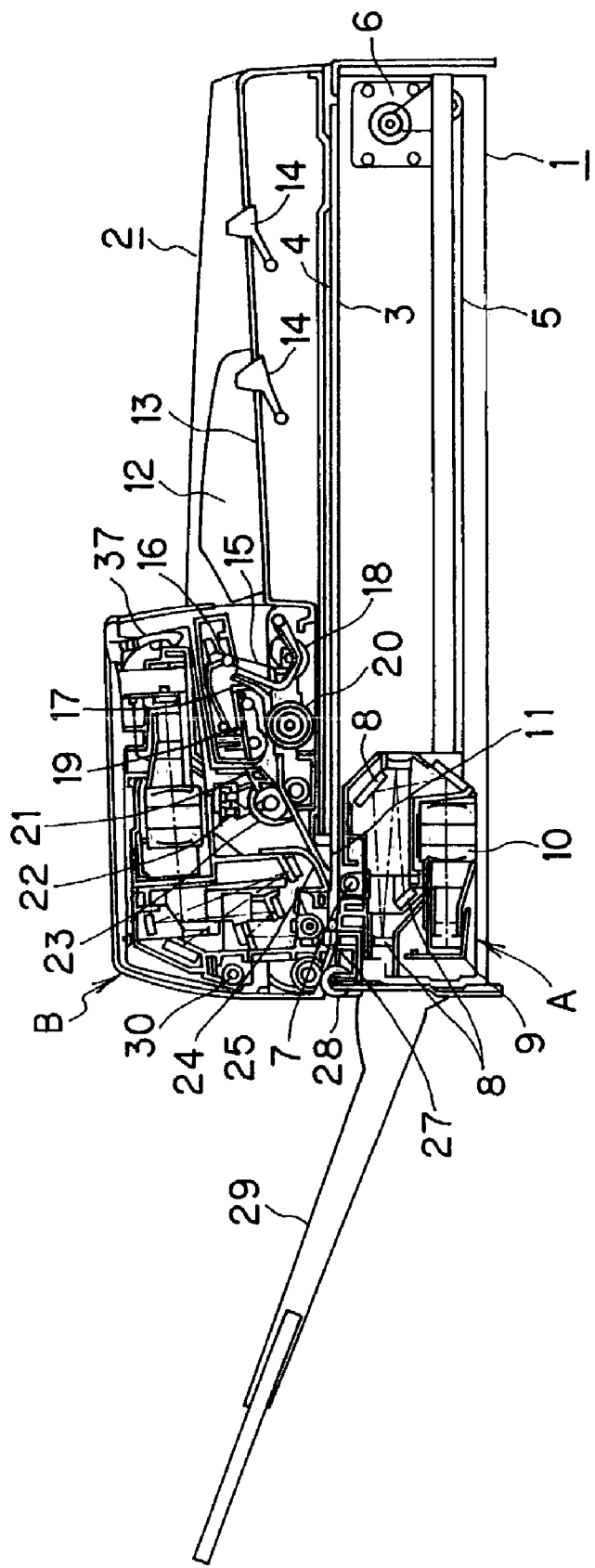
FIG. 7 is a view showing an image reading apparatus in accordance with a fifth embodiment of the present invention.
Figure 8:
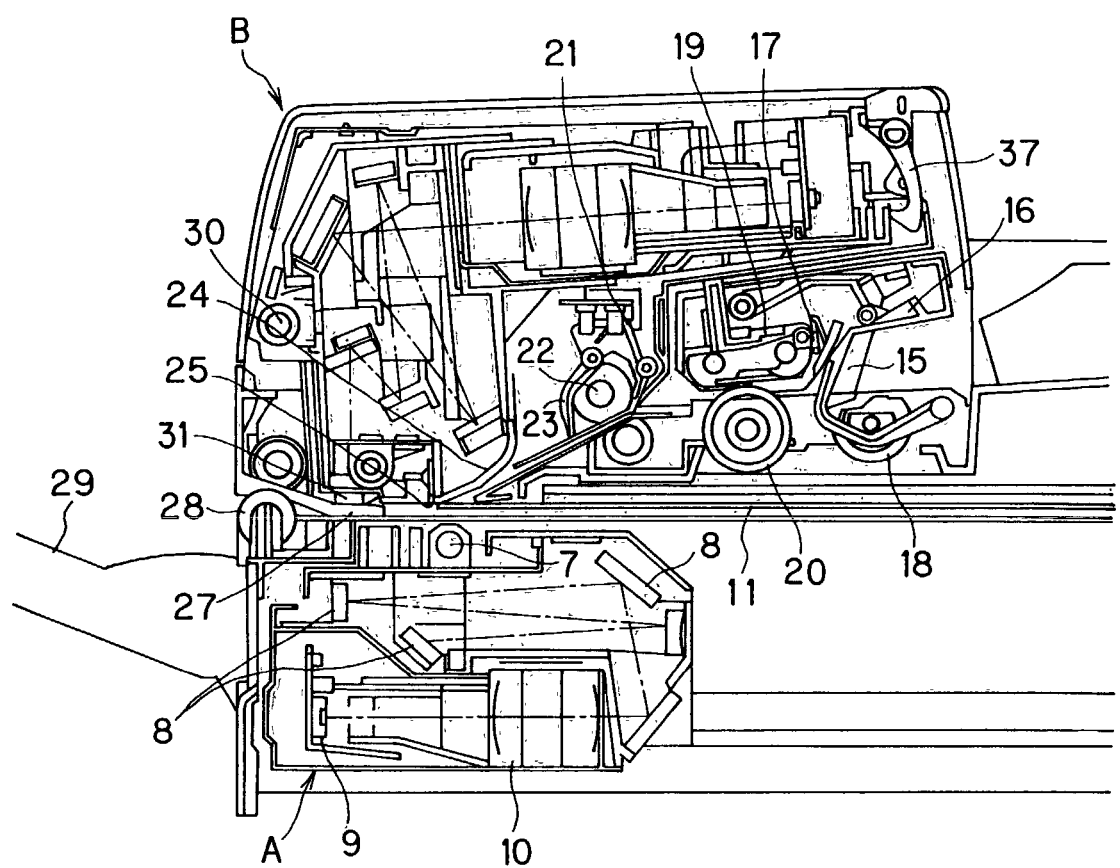
FIG. 8 is a detailed view of an image reading unit of the image reading apparatus.
Figure 9:
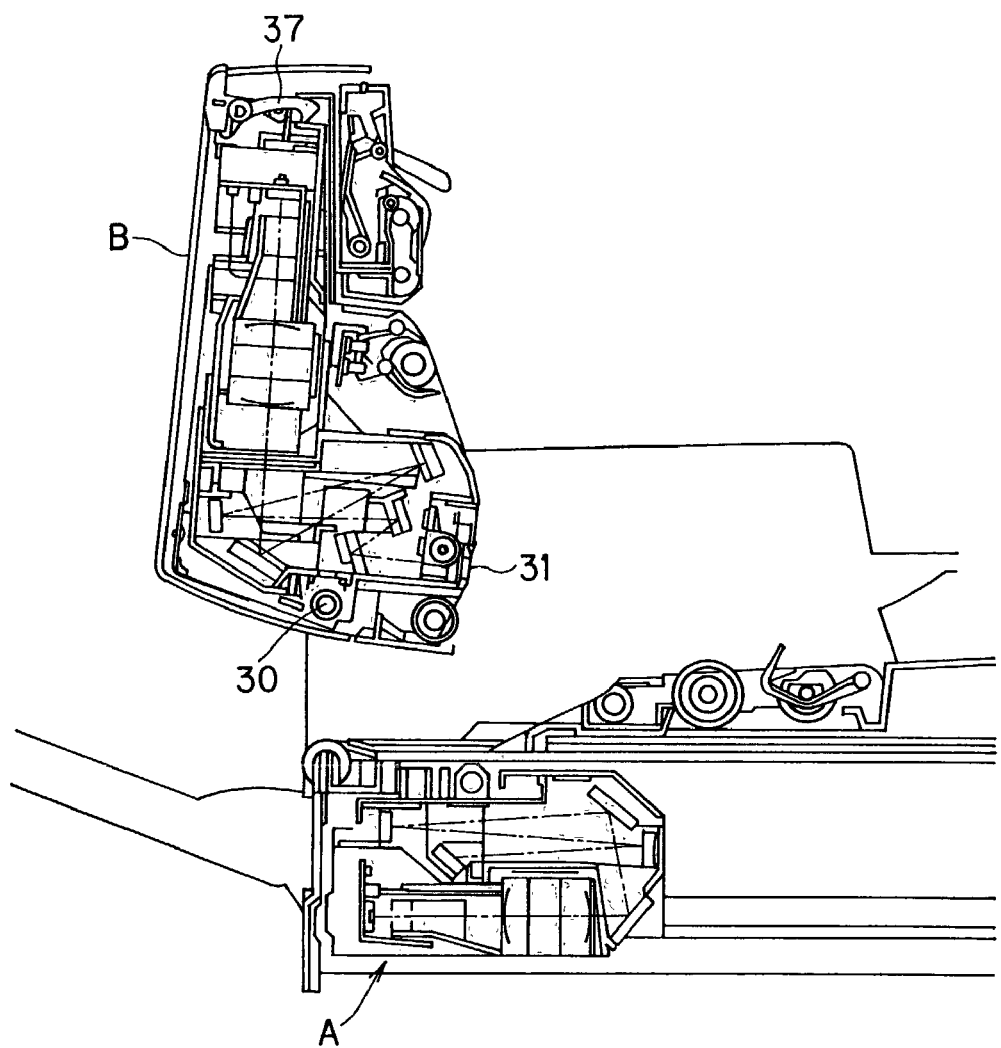
FIG. 9 is a view showing the image reading unit in accordance with the fifth embodiment of the present invention.

FIG. 7 is a view showing an image reading apparatus that is an embodiment of the present invention. FIG. 8 is a detailed view of a reading unit. Since this embodiment is basically the same as the configuration shown in FIG. 1, only different parts will be described. FIG. 9 is a view showing a state in which the reading unit on the upper side of FIG. 8 is opened. As shown in FIG. 9, the second optical carriage B becomes pivotal with respect to an image reading apparatus main body around a shaft 30 by releasing a hook 37. Consequently, a conveying path of an original is divided into upper and lower parts, thus allowing various sheet handling work such as removal of jammed sheet becomes possible. In addition, the second optical carriage B has an actuator for actuating a not-shown interlock switch provided in the image reading apparatus. As the second optical carriage B is opened, power supply of the image reading apparatus is cut off to prevent it from operating.

Figure 10:
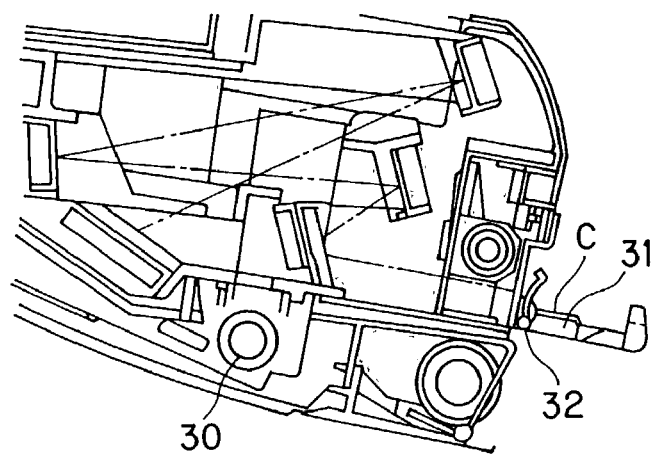
FIG. 10 is a view showing a state in which a translucent member is opened.

Then, in the state in which the second optical carriage B is opened, the glass 31 is pivotal around the pivotal shaft 32 and is openable and closable with respect to the second optical carriage B as shown in FIG. 10.

Figure 11A:
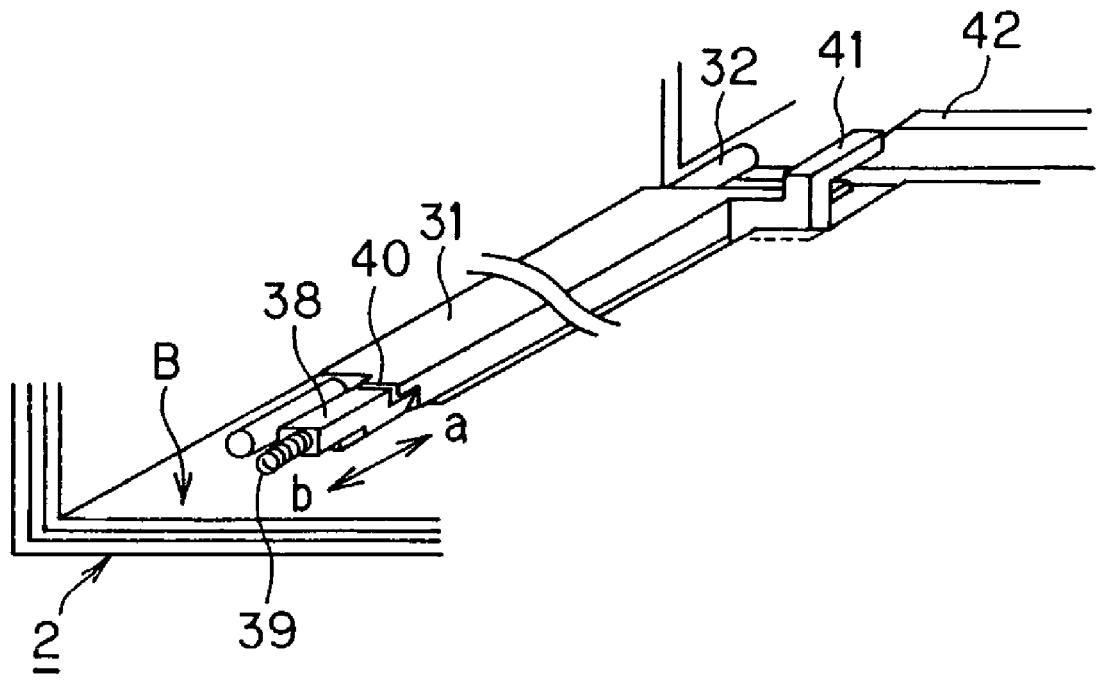
FIG. 11A is a view of an image reading part viewed from its inside.
Figure 11B:
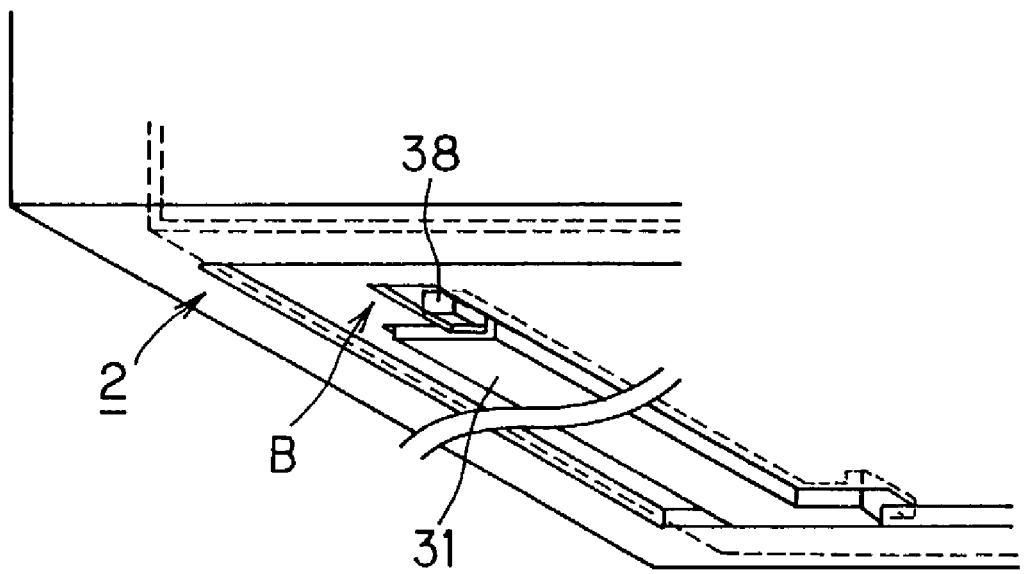
FIG. 11B is a view of the image reading part viewed from its outside.

FIGS. 11A and 11B are perspective views showing the vicinity of the reading glass 31 of the second optical carriage B. FIG. 11A is a view of the upper surface of the glass 31 viewed from the inside of the second optical carriage B and FIG. 11B is a view of the same viewed from below the ADF unit 2.

A lock slider 38 is provided in the second optical carriage B as shown in FIGS. 11A and 11B. The lock slider 38 is biased toward the glass 31 by a spring 39 and is slidable in directions of arrows a and b. A projection 40 engaging with the lock slider 38 is provided at one end of the glass 31. In a closed state of the glass 31, the glass 31 is held in the closed state by the lock slider 38. When the lock slider 38 is slid in the arrow b direction, regulation of the glass 31 is released so that the glass 31 can be opened with respect to the second optical carriage B. In the state in which the glass 31 is opened, the lock slider 38 is biased in the arrow a direction by the spring 39.

When the glass 31 is closed, since a slope of the projection 40 of the glass 31 slides the lock slider 38 in the arrow b direction, the glass 31 can be held in its closed position without operating the lock slider 38.

In addition, an arm 41 for guiding the operation of the glass 31 is provided at the other end of the glass 31. In the state in which the second optical carriage B is closed, the arm 41 is inside the image reading apparatus as shown in FIGS. 11A and 11B, whereby the glass 31 cannot be opened even if the lock slider 38 is slid. When the optical carriage B is opened, it becomes possible to open the glass 31. However, when the optical carriage B is gradually closed with the glass 31 kept open, the glass 31 is gradually closed as the arm 41 moves along a guiding portion 42 provided in the image reading apparatus. When the optical carriage B is completely closed, the glass 31 is automatically held in its closed position by the lock slider 38.

Further, since it is sufficient for the glass 31 to have a translucent member only in an image reading position, the projection 40 and the arm 41 may be separate materials that are integrally formed with the glass 31 or separate parts that are fixed to the glass 31.

Incidentally, the second optical unit B opens and closes, thereby regulating the opening and closing of the glass 31 in this embodiment. Conversely, the image reading apparatus may be configured such that a component or a unit such as a cover opens and closes with respect to the second optical unit B, thereby opening the arm 41 and allowing the glass 31 to open and close.

Therefore, this embodiment has the following characteristics.

FIG. 10 is a sectional view showing a state in which the glass 31 is opened with respect to the second optical carriage B. As shown in the figure, in the state in which the glass 31 is opened, a user can access a surface (a surface on the opposite side of the original conveying side) C on the inner side of the glass 31, and it becomes possible to clean the surface C on the inner side of the glass 31 even if dusts or the like accumulate on the surface C on the inner side of the glass 31.

Figure 12A:
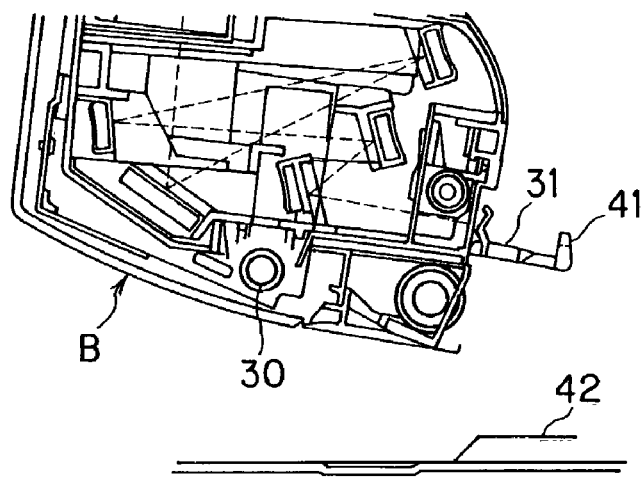
FIGS. 12A to 12C are views illustrating closing operations of the translucent member.
Figure 12B:
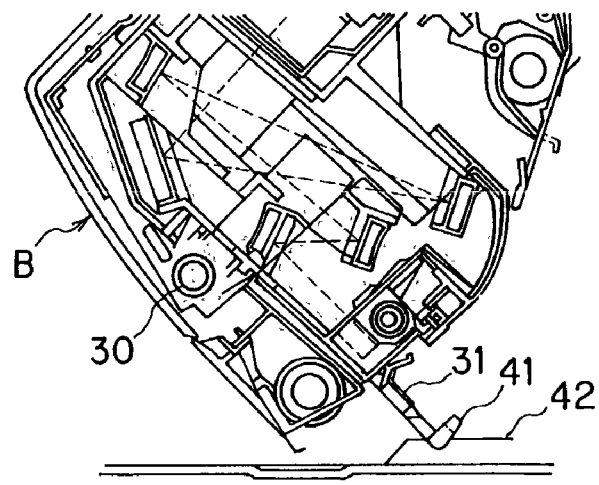
Figure 12C:
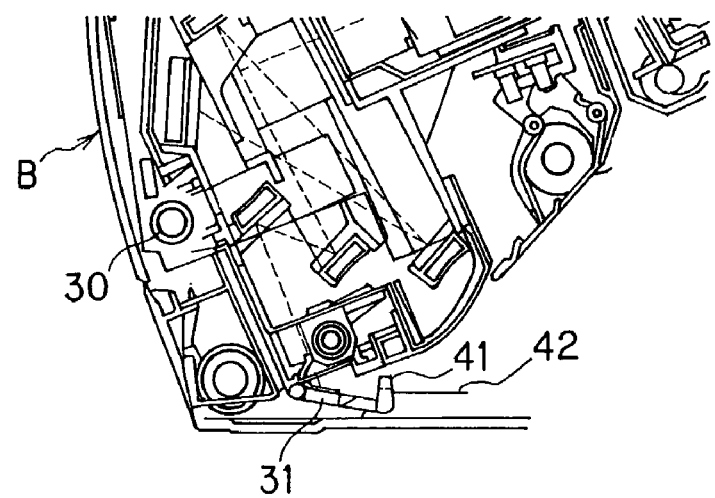

In addition, as shown in FIGS. 12A to 12C, when the second optical carriage B is gradually closed with the glass 31 is kept open from a state in which the second optical carriage B is opened and the glass 31 is also opened, the arm 41 is gradually closed by abutting the guiding portion 42. At an instance when the second optical carriage B is completely closed, the projection 40 of the glass 31 moves the lock slider 38 in the arrow b direction of FIG. 11A. When the glass 31 reaches its completely closed position, the lock slider 38 moves in the arrow a direction by the spring 39 and holds the glass 31 in its closed position. Consequently, breakage of the glass 31 can be prevented even if the second optical carriage B is closed while the glass 31 is kept open.

Further, in the state in which the second optical carriage B is open, a not-shown interlock switch is cut off and the operation of the image forming apparatus becomes impossible. That is, in the state in which the second optical carriage B is closed and the image forming apparatus can operate, the glass 31 always comes to be in the closed state. Consequently, when the glass 31 is opened, the image forming apparatus always comes to be in a state in which its operation is stopped, whereby a user is prevented from touching the lighted lamp 7 during cleaning of the inner side of the glass 31 and causing the image forming apparatus to operate in the state in which the glass 31 is open to damage an original.

According to the image reading apparatus in accordance with this embodiment described above, the glass 31 on the reading surface is configured to be openable and closable with respect to the upper original conveying guide 24 functioning as the frame of the optical system, whereby the surface C on the inner side of the glass 31 that is the inner side of the reading window can be easily cleaned, and deterioration of an image due to a dust inside the apparatus adhering to the surface C on the inner side of the glass 31 can be prevented.

In addition, since the glass 31 opens only in the state in which the second optical carriage B is opened, the image forming apparatus can be prevented from being operated in the state in which the glass 31 is open to be broken or to damage an original. Further, if the second optical carriage B is closed with the glass 31 kept open, since the glass 31 is automatically closed, breakage of the image forming apparatus can be prevented.

(Sixth Embodiment)

Figure 13:
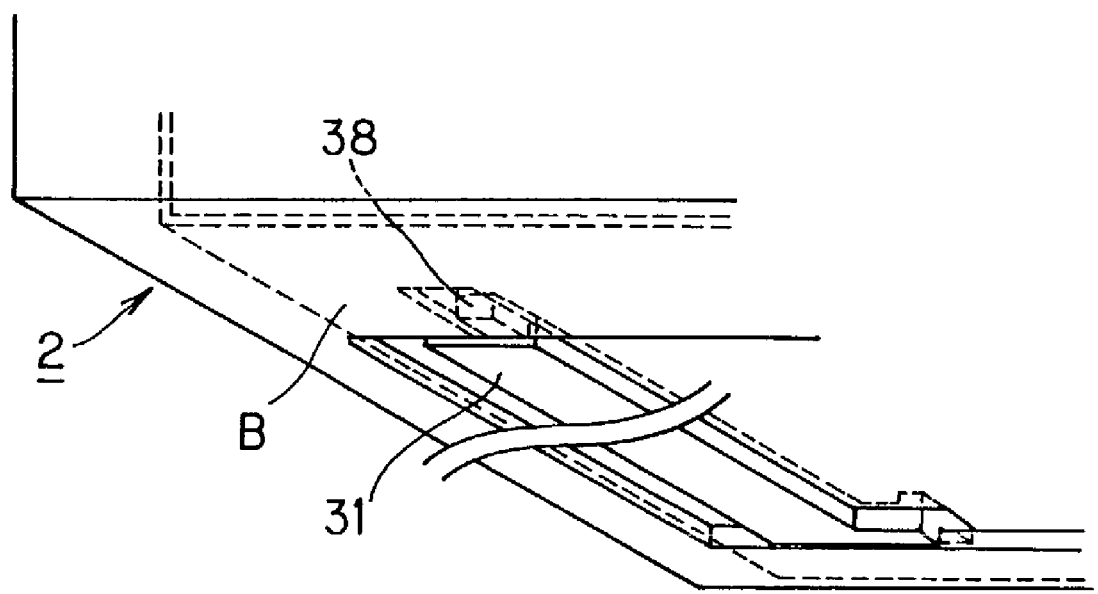
FIG. 13 is a view showing an image reading part in accordance with a sixth embodiment of the present invention.

Next, a sixth embodiment of the present invention will be described. Since this embodiment is basically the same as the configuration shown in FIG. 7, only different parts will be described. FIG. 13 is a partial perspective view of an image reading apparatus in accordance with the sixth embodiment of the present invention and is a view of the vicinity of the glass 31 of the second optical carriage B as taken from below the ADF unit 2 in the same manner as FIG. 11B.

In an image reading apparatus having substantially the same configuration as the fifth embodiment, the lock slider 38 is inside the image forming apparatus and cannot be operated from the outside in the state in which the second optical carriage B is closed as shown in FIG. 13. That is, the lock slider 38 is exposed to the outside only when the second optical carriage B is opened, whereby it becomes possible to release the holding of the glass 31.

In the fifth embodiment, since the lock slider 38 is exposed to the outside when the ADF unit 2 is opened in order to load an original on the original table, the glass 31 is prevented from opening by the arm 41 even if the lock slider 38 is operated. However, in this embodiment, since the lock slider 38 is not exposed to the outside even if the ADF unit 2 is opened, confusion in operating the image forming apparatus can be prevented.

(Seventh Embodiment)

Figure 14:
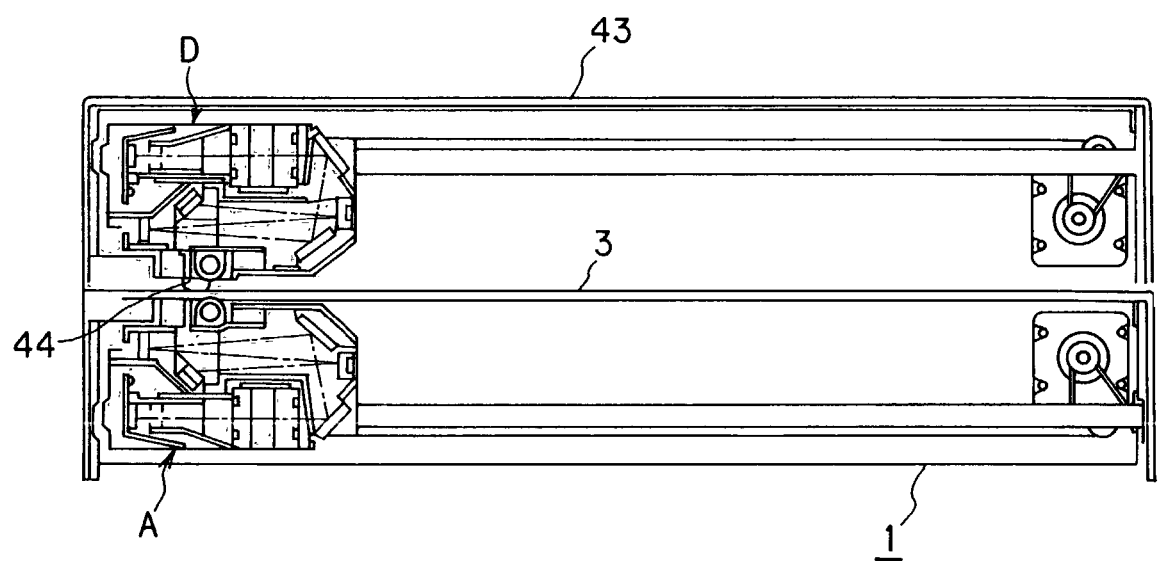
FIG. 14 is a view showing an image reading apparatus in accordance with a seventh embodiment of the present invention.

Next, a seventh embodiment of the present invention will be described. Since this embodiment is basically the same as the configuration shown in FIG. 7, only different parts will be described. FIG. 14 is a side sectional view of an image forming apparatus in accordance with the seventh embodiment of the present invention. As shown in the figure, another stationary original reading unit 43 for reading an upper surface of an original mounted on the original table glass 3 is provided above the FB unit 1. A second optical carriage D existing above the original reads an image on the upper surface of the original while moving along the upper surface of the original.

In the image reading apparatuses in accordance with the fifth and sixth embodiments, original reading is performed by reading an image while moving an original at a predetermined speed with respect to the second optical carriage B that is fixed for reading an upper surface of an original. In this embodiment, it is possible to perform original reading by the stationary original reading mode with respect to an upper surface of an original as well.

In the image reading apparatus of such a configuration, glass 44 is openable and closable with respect to the second optical carriage D in order to clean the inside of the glass 44 in a reading position of the second optical carriage D as in the fifth embodiment, and the glass 44 is openable and closable only in the state in which the second optical carriage D is opened. Thus, the same effects as in the fifth embodiment can be realized.

As is evident from the above descriptions, according to the present invention, the following effects can be realized. That is, since the translucent plate member is configured openable and closable with respect to the frame for holding the image reading means, the rear surface of the translucent plate member which is on the opposite side of the original conveying side can be easily cleaned and deterioration of an image due to a dust inside the apparatus adhering to the translucent plate member can be prevented. In addition, since the image reading apparatus does not operate with the translucent plate member kept open, occurrence of breakage of the image reading apparatus and damage to an original can be prevented.

Further, although the translucent plate member positioned above an original is described in the above-mentioned embodiments, the present invention may be applied to an optical unit that is positioned below an original and reads a lower surface of the original.

In addition, although the image reading apparatus is described in the above-mentioned embodiments, the present invention can be applied to an image forming apparatus that has this image reading apparatus as an image reading unit and forms an image of an original read by the image reading unit on a sheet. Examples of the image forming apparatus include, for example, an image forming apparatus of an electrophotographic system with which exposure is performed on a photosensitive drum according to image information, an electrostatic latent image is developed by toner and a toner image is transferred to a sheet, and an image forming apparatus of an ink jet system with which ink is injected in accordance with a read image. The present invention can be applied to any image forming apparatus as long as it has this image reading apparatus as an image reading unit.

The embodiments of the present invention have been described. However, the present invention is not limited to the above-mentioned embodiments at all and any modification is possible within technical thoughts of the present invention.

What is claimed is:

1. An original scanning apparatus comprising:
    a light source for illuminating an original;
    a case for housing said light source; and
    a translucent member through which light is transmitted from the original illuminated by said light source, wherein said translucent member is openable and closable with respect to said case by rotation of said translucent member around a pivotal shaft as the center of rotation, and wherein a surface of said translucent member, on an opposite side of a surface opposing an original, is exposed when said translucent member is opened.

2. An original scanning apparatus according to claim 1, further comprising a reflecting member for reflecting light from said light source, said reflecting member being formed integrally with said translucent member.

3. An original scanning apparatus according to claim 2, wherein said reflecting member closes an opening that is formed as said translucent member opens.

4. An original scanning apparatus according to claim 1, further comprising biasing means for biasing said translucent member in a direction wherein said translucent member is closed with respect to said case.

5. An original scanning apparatus according to claim 1, further comprising locking means for locking said translucent member to said case.

6. An original scanning apparatus according to claim 1, further comprising scanning means which includes said light source and said translucent member,
wherein said scanning means is openable and closable with respect to an apparatus main body.

7. An original scanning apparatus according to claim 6, wherein said translucent member is allowed to open when said scanning means is open and said translucent member is prohibited from opening when said scanning means is closed.

8. An original scanning apparatus according to claim 6, further comprising guiding means for guiding movement of said translucent member, wherein said translucent member is closed by said guiding means when said scanning means is closed from a state in which said scanning means and said translucent member are opened.

9. An original scanning apparatus according to claim 6, further comprising an operation unit for opening said translucent member,
wherein said operation unit exists inside the apparatus main body when said scanning means is closed.

10. An original scanning apparatus according to claim 1, wherein said translucent member is positioned above the original.

11. An original scanning apparatus according to claim 6, wherein said scanning means is fixed and original scanning is performed as the original moves in a position opposing said translucent member.

12. An original scanning apparatus according to claim 1, wherein original scanning is performed as said scanning means moves with respect to an original mounted on a fixed original table.

* * * * *

UNITED STATES PATENT AND TRADEMARK OFFICE
CERTIFICATE OF CORRECTION

PATENT NO. : 7,212,317 B2  Page 1 of 1
APPLICATION NO. : 10/187792
DATED : May 1, 2007
INVENTOR(S) : Atsushi Ogata It is certified that error appears in the above-identified patent and that said Letters Patent is hereby corrected as shown below:

On the Title page,

[*] Notice: Subject to any disclaimer, the term of this patent is extended or adjusted under 35 USC 154(b) by (847) days Delete the phrase "by 847 days" and insert -- by 811 days--

Signed and Sealed this

Twenty-seventh Day of November, 2007

JON W. DUDAS
*Director of the United States Patent and Trademark Office*

UNITED STATES PATENT AND TRADEMARK OFFICE
CERTIFICATE OF CORRECTION

PATENT NO.        : 7,212,317 B2
APPLICATION NO. : 10/187792
DATED             : May 1, 2007
INVENTOR(S)       : Atsushi Ogata It is certified that error appears in the above-identified patent and that said Letters Patent is hereby corrected as shown below:

ON COVER PAGE [75] INVENTOR:

Inventor, "Atsushi Ogata, Tokyo (JP)" should read --Atsushi Ogata, Shizuoka (JP)--.

COLUMN 1:

Line 58, "a" should be deleted.

COLUMN 2:

Line 5, "a" should be deleted.

COLUMN 6:

Line 36, "a" should be deleted; and
Line 66, "a large" should read --a large amount of--.

COLUMN 8:

Line 44, "dusts" should read --dust--.

COLUMN 9:

Line 4, "damage" should read --damage of--; and
Line 13, "a" should be deleted.

COLUMN 10:

Line 20, "a" should be deleted.

UNITED STATES PATENT AND TRADEMARK OFFICE
CERTIFICATE OF CORRECTION

PATENT NO. : 7,212,317 B2
APPLICATION NO. : 10/187792
DATED : May 1, 2007
INVENTOR(S) : Atsushi Ogata It is certified that error appears in the above-identified patent and that said Letters Patent is hereby corrected as shown below:

COLUMN 12:

Lines 19-22, "Claim 12" should be deleted.

Signed and Sealed this

Seventeenth Day of November, 2009

David J. Kappos
*Director of the United States Patent and Trademark Office*